(12) United States Patent
Haeberer et al.

(10) Patent No.: US 8,413,430 B2
(45) Date of Patent: Apr. 9, 2013

(54) METERING MODULE WITH IMPROVED ACOUSTIC PROPERTIES

(75) Inventors: Rainer Haeberer, Bretten (DE); Burghard Kienzle, Gerlingen (DE); Siegbert Griesinger, Oetisheim (DE); Matthias Horn, Freiberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/532,332

(22) PCT Filed: Jan. 30, 2008

(86) PCT No.: PCT/EP2008/051126
§ 371 (c)(1),
(2), (4) Date: Jan. 20, 2010

(87) PCT Pub. No.: WO2008/113635
PCT Pub. Date: Sep. 25, 2008

(65) Prior Publication Data
US 2010/0146952 A1 Jun. 17, 2010

(30) Foreign Application Priority Data
Mar. 21, 2007 (DE) .......................... 10 2007 013 524

(51) Int. Cl.
*F01N 3/00* (2006.01)
*F01N 3/02* (2006.01)
*F01N 1/02* (2006.01)
*F16L 55/00* (2006.01)
*F16L 11/12* (2006.01)
*F16L 59/16* (2006.01)

(52) U.S. Cl.
USPC ................... 60/295; 60/286; 60/320; 285/47; 181/250

(58) Field of Classification Search .................... 60/286, 60/320, 295; 285/47; 181/250
See application file for complete search history.

(56) References Cited

U.S. PATENT DOCUMENTS

| 3,987,820 | A | * | 10/1976 | Alewitz ....................... 138/109 |
| 4,233,812 | A | * | 11/1980 | Leistritz ......................... 60/320 |
| 4,284,297 | A | * | 8/1981 | Godkin ........................... 285/47 |
| 4,454,767 | A | * | 6/1984 | Shinkai et al. ............. 73/861.18 |
| 6,581,722 | B2 | * | 6/2003 | Faulhaber et al. ............ 181/250 |

FOREIGN PATENT DOCUMENTS

| JP | 2002522703 A | 7/2002 |
| JP | 2003083041 A | 3/2003 |
| JP | 2005127318 A | 5/2005 |

* cited by examiner

*Primary Examiner* — Kenneth Bomberg
*Assistant Examiner* — Dapinder Singh
(74) *Attorney, Agent, or Firm* — Michael Best & Friedrich LLP

(57) ABSTRACT

The invention relates to a device for metering a liquid reducing agent into an exhaust gas system for the reduction of pollutants in the exhaust gas. The device comprises a metering valve and an adapter to be mounted on an exhaust gas pipe. The metering valve is connected to the adapter by a connector element, which has at least one metal sound absorber.

20 Claims, 2 Drawing Sheets

METERING MODULE WITH IMPROVED ACOUSTIC PROPERTIES

CROSS-REFERENCE TO RELATED APPLICATION

This application is a 35 USC 371 application of PCT/EP2008/051126 filed on Jan. 30, 2008.

BACKGROUND OF THE INVENTION

1. Field of the Invention

The invention relates to a device for metering a reducing agent into an exhaust system. Such devices are used particularly for reducing pollutants in exhaust gases.

2. Description of the Prior Art

In internal combustion engines, in particular diesel engines, because of the increasingly stringent exhaust gas regulations coming in the next few years, among other things the proportion of nitrogen oxides in the exhaust gas will have to be reduced. For reducing the proportion of nitrogen oxide in the exhaust gas, selective catalytic reduction (SCR) is for instance performed, in which the nitrogen oxides are reduced with the aid of reducing agents to nitrogen and water. As reducing agents, an aqueous urea solution, for instance, is employed. Typically, the pollutant NOx is reduced to $N_2$ and $H_2O$ with the aid of liquid reducing agents.

The reducing agent is typically stored in a tank and pumped via a line from the tank to a metering module, with which the metering module is injected, for instance into the exhaust tube. One example of such a device is shown in European Patent Disclosure EP 0 982 884 A2.

The metering module typically has a metering valve, which is received by an adapter. This adapter with the metering valve can be mounted on or screwed onto the exhaust tube.

One problem in such metering modules with a metering valve and an adapter, however, is that a switching operation of the metering valve causes a great deal of noise. A switching operation (for instance, opening or closing the metering valve) leads to structure-borne sound in the structure, in particular the adapter, surrounding the valve. This structure-borne sound is transmitted from the outer faces of the adapter to the surrounding air and emitted as airborne sound.

From the field of automotive technology, various possibilities for acoustic insulation are already known in the prior art. Besides insulation mats and insulation foams of woven fabrics, and mineral fibers or polymer foams, metal sound absorbers are sometimes also used. One example of such metal sound absorbers is disclosed in German Patent Disclosure DE 103 45 575 B3. In it, a device for acoustic and thermal shielding is proposed that has a platelike element with a layer of a metal cloth with warp filaments and weft filaments. The warp and weft filaments are joined together at their contact points by sintering, in such a way that the metal cloth has pores.

One problem in using such special metal insulating materials, however, is that such materials are comparatively expensive compared to conventional materials, and that conventional machining and production processes that are usual in automotive technology cannot be employed in all cases.

SUMMARY OF THE INVENTION

A device for metering a liquid reducing agent into an exhaust system for reducing pollutants is therefore proposed which furnishes efficient and technically easily feasible acoustic insulation of the switching noises. By suitable provisions on the adapter, the transmission of the structure-borne sound from the valve via the adapter to the air surrounding the adapter is reduced. Thus the airborne sound arising from the structure-borne sound is reduced.

It should be pointed out that the device is proposed here as a device for metering liquid reducing agents. However, in principle, the proposed device can also be used for other kinds of connections, such as for inserting probes into exhaust tubes when the probes are supposed to be supported in a vibration-damped manner. Still other applications are conceivable. However, the application described above in the context of an SCR system is preferred.

The proposed device includes a metering valve, for instance a metering valve in accordance with the prior art described at the outset, for introducing the liquid reducing agent in metered fashion. Moreover, the device includes an adapter for mounting (for instance for seating, screwing, or force- and/or material-locking connection) on or onto an exhaust tube. The metering valve is connected to the adapter by a connecting element, and this connecting element has at least one metal sound absorber.

The use of the metal sound absorber on the one hand assures high temperature stability of the device, which is advantageous especially in the automotive field. Moreover, as known from the prior art, metal sound absorbers assure high efficiency of sound absorption.

On the other hand, the fact that preferably only the connecting element, connecting the adapter and the metering valve, is made entirely or in part of the metal sound absorber, for the sake of reducing costs and for markedly simplified production methods. For instance, the volume of the sound absorber material can be greatly reduced, which reduces costs. Furthermore, production methods that are conventional in automotive technology can still be used for the adapter and the metering valve as before, so that only minimal changes in standard processes are necessary.

The metal sound absorber can have at least one of the following absorber elements: a porous metal element, in particular a sintered element; a metal composite material; a metal mesh, in particular a sintered mesh and/or a rolled mesh; a metal cloth, in particular a sintered cloth and/or a rolled cloth. Thus metal foams, for instance, with good insulating properties can be employed.

However, it is especially preferable if a metal cloth is used of the kind used for instance in DE 103 45 575 B3 already mentioned above. In the production of this metal cloth, metal warp and weft filaments can be employed that are connected to one another at their contact points by sintering. Moreover, alternatively or in addition, rolling of the cloth can be done, to further improve the connection of the metal filaments.

Such metal cloths are sold for instance by the name "Poroblech" by Härle Produktentwicklung and can have aluminum, steel, or special steel, for instance, as metal materials. Still other materials are conceivable, however. Typical sheet-metal thicknesses range from 0.3 mm to 1 mm, and the proportion of pores is in the range from 5% to 60%.

Sound waves that penetrate between the metal filaments undergo friction resistance and are converted into heat.

It has proved especially efficient if a layered structure is employed in which at least one layer of the metal absorber element is combined with at least one layer of a reverberant element, preferably a reverberant metal. For instance, a defined spacing between the absorber element and the at least one layer of the reverberant element can be established to enhance the efficiency of the sound absorber. Preferably, a small spacing should be selected, which can also be filled with an inactive intermediate layer and which amounts for instance to <0.3 mm.

The sound is reflected by the reverberant wall and must pass again through the sound absorber material, as a result of which (depending on the spacing between the reverberant wall and the absorber material), targeted frequency ranges can for instance be eliminated from the sound spectrum. For instance, for targeted influence on certain frequency ranges, inactive intermediate layers can also be introduced between the absorber element and the at least one layer of the reverberant element, and these intermediate layers serve solely the purpose of establishing a defined spacing between these two elements and thus of establishing a targeted frequency selectivity.

The term "reverberant" element is understood to mean an element which has a high acoustic impedance, in particular a higher acoustic impedance than the absorber element. For instance, these materials with high acoustical stiffness are steel (acoustic impedance or characteristic acoustic impedance $z=4.7\times10^7$ Ns/m$^3$) or other solid metal materials. It is preferable if the characteristic acoustic impedance is above $10^7$ Ns/m$^3$, preferably above $4\times10^7$ Ns/m$^3$.

If this layered structure comprising an absorber element and a reverberant element is used, then preferably the absorber element layer is disposed on a side of the connecting element facing toward the adapter, and the layer of the reverberant element is disposed on the side of the connecting element pointing away from the absorber. The connecting element can in particular have at least one disklike element, which preferably has a groove for receiving the metering valve.

It is preferred if the disklike element is embodied as a U-shaped element, with a U-shaped groove for engagement with a corresponding groove of the metering valve. Besides the groove, the disklike element can then have a contact face for resting on the adapter. The layered structure comprising the absorber element and the reverberant element can be attained for instance by superposition, in particular congruent superposition, of suitable disklike elements, creating the described layered structure.

The disklike sound absorber element and the disklike reverberant element may be connected to one another in force- or form-locking fashion, for instance (such as by a weld). In order not to hinder the described reflection effect at the reverberant element, this connection can be limited for instance to the peripheral region, for instance by means of welding only in the peripheral region. Simply placing these two disklike elements one on top of the other, however, is also conceivable, as is the use, as described above, of additional elements such as intermediate disks or further disks in order to create a multi-layer structure.

For connecting the metering valve, the disklike element, and the adapter, the connecting element can also have a clamp, for instance, in particular a flexible clamp (that is, one equipped with flexible properties). Still other types of connections can also be used, however, such as union nuts, screw fasteners, or claws.

In this way, an economical, simple to produce yet highly efficient acoustical insulation of SCR systems can be achieved.

BRIEF DESCRIPTION OF THE DRAWINGS

Exemplary embodiments of the invention described in further detail in the ensuing description, in conjunction with the drawing in which.

DESCRIPTION OF THE PREFERRED EMBODIMENTS

Figure 1:
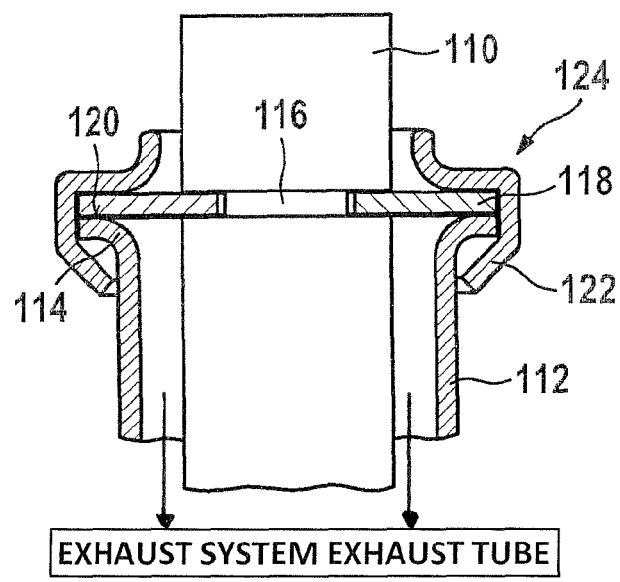
FIG. 1 shows a device according to the invention for metering a liquid reducing agent, in a side view.

In FIG. 1, one exemplary embodiment of a device according to the invention for metering a liquid reducing agent into an exhaust system is shown. The device includes a metering valve 110, which may be embodied as a pressure-controlled metering valve, for instance, such as one in accordance with the aforementioned prior art.

This metering valve 110, on its upper end in FIG. 1, is connected, for instance via a pipeline system, to a suitable tank for storing the liquid reducing agent; pumps and other elements may also be provided in this pipeline system. With its nozzle end (not shown in FIG. 1), the metering valve 110 is thrust into an adapter 112 in the shape of a cylindrical sleeve. This adapter 112 is embodied on its lower end (not shown in FIG. 1) for being attached to an exhaust tube, for instance by screwing, clamping, welding, or the like. The adapter 112 is designed such that the metering valve 110 preferably protrudes at least partway into the exhaust tube.

Figure 2A:
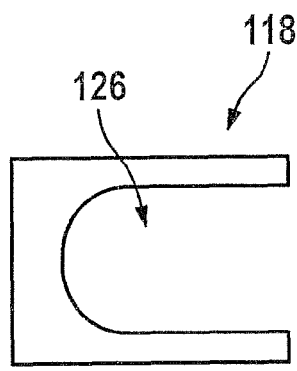
FIG. 2A shows a conventional U-shaped disk for connection between the metering valve and the adapter.
Figure 2A:
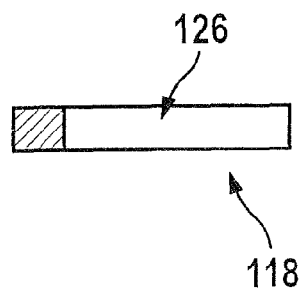

On its upper end, the adapter 112 is provided with a crimp 114. The metering valve 110, in its top region, has a groove 116. This groove is engaged by a U-shaped disk 118, which rests with a contact face 120 on the crimp 114 of the adapter 112. Via the groove 116 and the U-shaped disk 118, the metering valve 110 is positioned in a defined axial position. This axial position of the metering valve 110 is fixed via a flexible clamp 122. The clamp 122 and the U-shaped disk 118 thus jointly form a connecting element 124. In FIG. 2A, a conventional U-shaped disk 118 is shown in a plan view (at the top) and in a sectional view from the side (at the bottom). It can be seen that the U-shaped disk also has a U-shaped groove 126, which can engage the groove 116 of the metering valve 110. Typically, the U-shaped disks 118, as shown in FIG. 2A, are embodied as solid sheet-metal disks, for instance sheet steel disks.

Figure 2B:
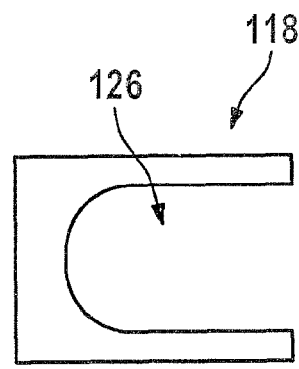
FIG. 2B shows an embodiment according to the invention of the U-shaped disk.
Figure 2B:
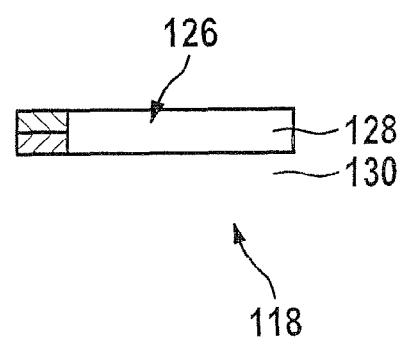

In FIG. 2B, conversely, an embodiment according to the invention of a U-shaped disk 118 is shown in a top view from above (at the top) and a sectional view from the side (at the bottom). It can be seen that the U-shaped element 118 comprises two elements placed one above the other, namely a reverberant element 128 and a sound absorber element 130. The two elements 128, 130 together in plan view have the U-shaped form and are preferably embodied as virtually congruent. In the exemplary embodiment shown, the two elements 128, 130 are embodied with virtually the same thickness, but still other embodiments are also possible.

The reverberant element 128, which like the sound absorber element 130 is embodied in disklike fashion, is disposed on the side of the U-shaped disk 118 facing away from the adapter 112 (that is, at the top in FIG. 1), and the sound absorber element 130 is disposed on the side facing toward the adapter 112, that is, toward the crimp 114 of the adapter 112.

The two disklike elements 128, 130 can simply be placed one above the other, and these are then held together by the flexible clamp 122. Alternatively or in addition, the two disklike elements 128, 130 may also be connected in material-locking fashion, for instance by a weld. Thus the two disklike elements 128, 130 replace the former solid U-shaped disk 118 of the exemplary embodiment in FIG. 2A.

By means of an inactive intermediate layer between the reverberant element 128 and the sound absorber element 130, which layer is not shown in the drawings, noise reduction could be improved still further. Inorganic or organic materials, in particular plastic layers, such as plastic films or foam films, or metal materials can be named as examples of materials for the intermediate layer. Various other inactive materials or combinations of materials are conceivable. With a zero spacing, that is, with the reverberant element 128 and sound absorber element 130 lying directly on one another, there is indeed already a sound reduction, but this could be further optimized by means of the intermediate layer. The degree of sound absorption can depend on the material properties and on the thickness of the inactive intermediate layer.

This combination of disks in FIG. 2B, in conjunction with FIG. 1, comprising a sound absorber element 130 on the valve side and a reverberant element 128 on the side facing toward the hydraulic connection leads to high sound absorption, especially since this combination of disks closes off the adapter 112 from the outside and thus absorbs the sound generated in the interior of the adapter 112 by the switching operation of the metering valve 110.

Figure 3A:
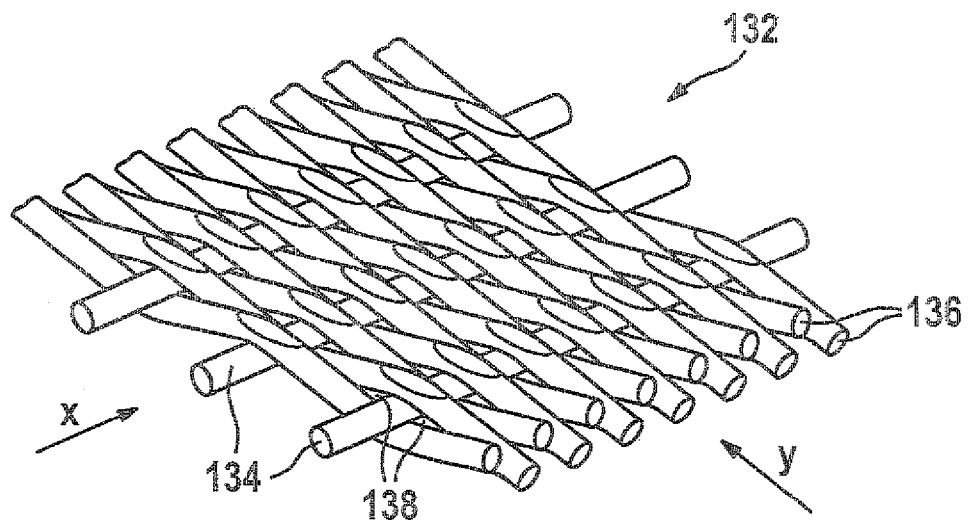
FIG. 3A shows one example of a metal mesh that can be used, seen in perspective.
Figure 3B:
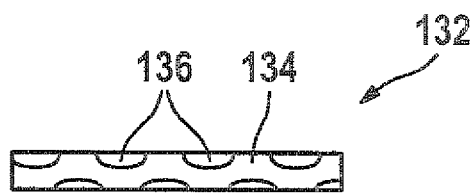
FIG. 3B shows a polished section of the metal mesh perpendicular to the y direction in FIG. 3A.
Figure 3C:
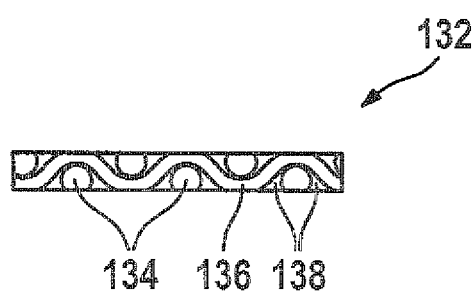
FIG. 3C shows a polished section through the metal mesh of FIG. 3A, in a plane perpendicular to the x direction.

In FIGS. 3A through 3C, a preferred exemplary embodiment of a metal sound absorber 132 is shown, of the kind that can be used in the sound absorber element 130 of FIG. 2B. In this case, the metal sound absorber 132 involves what is known as "Poroblech" (produced by Härle), which is commercially available. This sheet metal is produced from a metal cloth, for instance by the method described in DE 103 45 575 B3. As can be seen for instance in the perspective view in FIG. 3A, the cloth of the metal sound absorber 132 in this exemplary embodiment has warp filaments 134 and weft filaments 136 that are woven together. After the weaving, a rolling operation can ensue, to increase the mechanical strength of the cloth and to adjust the pore size. To increase the mechanical strength as well as to adjust the pore size, a sintering operation can moreover be employed (alternatively or in addition to the rolling).

The result is thus the structure shown in FIGS. 3B and 3C in the sectional view from the side (polished sections). FIG. 3B shows a polished section looking in the direction parallel to the weft filaments 136 (perpendicular to the direction y in FIG. 3A), while conversely FIG. 3C shows a polished section in the viewing direction parallel to the warp filaments 134 (that is, in a sectional plane perpendicular to the x direction in FIG. 3A). Particularly from FIGS. 3A and 3C, it can clearly be seen that the construction has pores 138 that bring about the above-described sound absorption effect.

By targeted adjustment of the production parameters, such as the filament density, the rolling, and/or the sintering process, the properties of the sound absorber 132 can be adjusted in a targeted way. In particular, targeted characteristic acoustic impedances of the metal sound absorber 132 can be established. As described above, typical porosities are for instance in the range of 5% or 40% (typically, between 5% and 60%). Typical sheet-metal thicknesses are in the range between 0.3 mm and 1 mm, and for the warp filaments 134 and/or the weft filaments 136, special steel, steel, aluminum (possibly in alloy with magnesium), or copper can be employed. However, still other materials can also be used. The metal sheets thus created of the metal sound absorbers 132 can be processed for instance by deep drawing, bending, punching, crimping, laser cutting, and/or welding.

The foregoing relates to the preferred exemplary embodiments of the invention, it being understood that other variants and embodiments thereof are possible within the spirit and scope of the invention, the latter being defined by the appended claims.

The invention claimed is:

1. A device for use in metering a liquid reducing agent into an exhaust system for reducing pollutants in an exhaust gas, the device comprising:
   a metering valve adapted for metering a liquid reducing agent;
   an adapter having a first end for mounting on an exhaust tube and a second end opposite the first end; and
   a connecting element connecting the metering valve and the second end of the adapter, wherein the connecting element includes at least one metal sound absorber,
   wherein at least one of the metering valve and the adaptor is fluidly coupled to an exhaust tube of the exhaust system.

2. The device as defined by claim 1, wherein the metal sound absorber has at least one of the following absorber elements: a porous metal element, in particular a sintered element; a metal composite material; a metal mesh, in particular a sintered mesh and/or a rolled mesh; a metal cloth, in particular a sintered cloth and/or a rolled cloth.

3. The device as defined by claim 2, wherein the metal sound absorber has a layered structure, having at least one layer of the absorber element and at least one layer of a reverberant element, preferably a reverberant metal.

4. The device as defined by claim 3, wherein the layer of the absorber element is disposed on a side of the connecting element facing toward the second end of the adapter.

5. The device as defined by claim 3, wherein at least one inactive intermediate layer is inserted between the layer of the absorber element and the layer of the reverberant element.

6. The device as defined by claim 4, wherein at least one inactive intermediate layer is inserted between the layer of the absorber element and the layer of the reverberant element.

7. The device as defined by claim 1, wherein the connecting element has at least one disklike element.

8. The device as defined by claim 6, wherein the connecting element has at least one disklike element.

9. The device as defined by claim 7, wherein the disklike element has at least one groove for receiving the metering valve, and preferably the disklike element is embodied as a U-shaped element, with a U-shaped groove for engagement with a groove of the metering valve.

10. The device as defined by claim 8, wherein the disklike element has at least one groove for receiving the metering valve, and preferably the disklike element is embodied as a U-shaped element, with a U-shaped groove for engagement with a groove of the metering valve.

11. The device as defined by claim 9, wherein the disklike element further has at least one contact face for resting on the adapter.

12. The device as defined by claim 7, wherein the disklike element has a first, disklike sound absorber element and a second, reverberant element facing away from, said first disklike element disposed between said second dislike element and said second end of the adapter.

13. The device as defined by claim 9, wherein the disklike element has a first, disklike sound absorber element and a second, reverberant element facing away from, said first disklike element disposed between said second dislike element and said second end of the adapter.

14. The device as defined by claim 11, wherein the disklike element has a first, disklike sound absorber element and a second, reverberant element facing away from, said first disklike element disposed between said second dislike element and said second end of the adapter.

15. The device as defined by claim 12, wherein the disklike sound absorber element and the disklike reverberant element are connected to one another in force-locking or form-locking fashion and form the disklike element.

16. The device as defined by claim 7, wherein the connecting element further has a clamp for force-locking connection of the metering valve, the disklike element, and the adapter.

17. The device as defined by claim 9, wherein the connecting element further has a clamp for force-locking connection of the metering valve, the disklike element, and the adapter.

18. The device as defined by claim 11, wherein the connecting element further has a clamp for force-locking connection of the metering valve, the disklike element, and the adapter.

19. The device as defined by claim 12, wherein the connecting element further has a clamp for force-locking connection of the metering valve, the disklike element, and the adapter.

20. The device as defined by claim 15, wherein the connecting element further has a clamp for force-locking connection of the metering valve, the disklike element, and the adapter.

\* \* \* \* \*

UNITED STATES PATENT AND TRADEMARK OFFICE
CERTIFICATE OF CORRECTION

PATENT NO.      : 8,413,430 B2                                   Page 1 of 1
APPLICATION NO. : 12/532332
DATED           : April 9, 2013
INVENTOR(S)     : Haeberer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 489 days.

Signed and Sealed this
First Day of September, 2015

Michelle K. Lee
*Director of the United States Patent and Trademark Office*